INVENTOR
Jan A. Rajchman
BY Morris ... [signature]
ATTORNEY

INVENTOR
Jan A. Rajchman
BY Morris Rabkin
ATTORNEY

MAGNETIC MATRIX AND COMPUTING DEVICES

INVENTOR
Jan A. Rajchman
BY Morris Rabkin
ATTORNEY

MAGNETIC MATRIX AND COMPUTING DEVICES

Filed March 8, 1952 8 Sheets-Sheet 4

INVENTOR
Jan A. Rajchman
BY Morris [signature]
ATTORNEY

Feb. 7, 1956 J. A. RAJCHMAN 2,734,182

MAGNETIC MATRIX AND COMPUTING DEVICES

Filed March 8, 1952 8 Sheets-Sheet 5

INVENTOR

Jan A. Rajchman

BY Morris Robbins

ATTORNEY

MAGNETIC MATRIX AND COMPUTING DEVICES

Filed March 8, 1952 8 Sheets-Sheet 6

INVENTOR
Jan A. Rajchman
BY Morris Rabkin
ATTORNEY

INVENTOR
Jan A. Rajchman
BY
ATTORNEY

Feb. 7, 1956 J. A. RAJCHMAN 2,734,182

MAGNETIC MATRIX AND COMPUTING DEVICES

Filed March 8, 1952 8 Sheets-Sheet 8

INVENTOR
Jan A. Rajchman
BY Morris Rabkin
ATTORNEY

United States Patent Office 2,734,182

Patented Feb. 7, 1956

2,734,182

MAGNETIC MATRIX AND COMPUTING DEVICES

Jan A. Rajchman, Princeton, N. J., assignor to Radio Corporation of America, a corporation of Delaware Application March 8, 1952, Serial No. 275,622

33 Claims. (Cl. 340—166)

Figure 1:
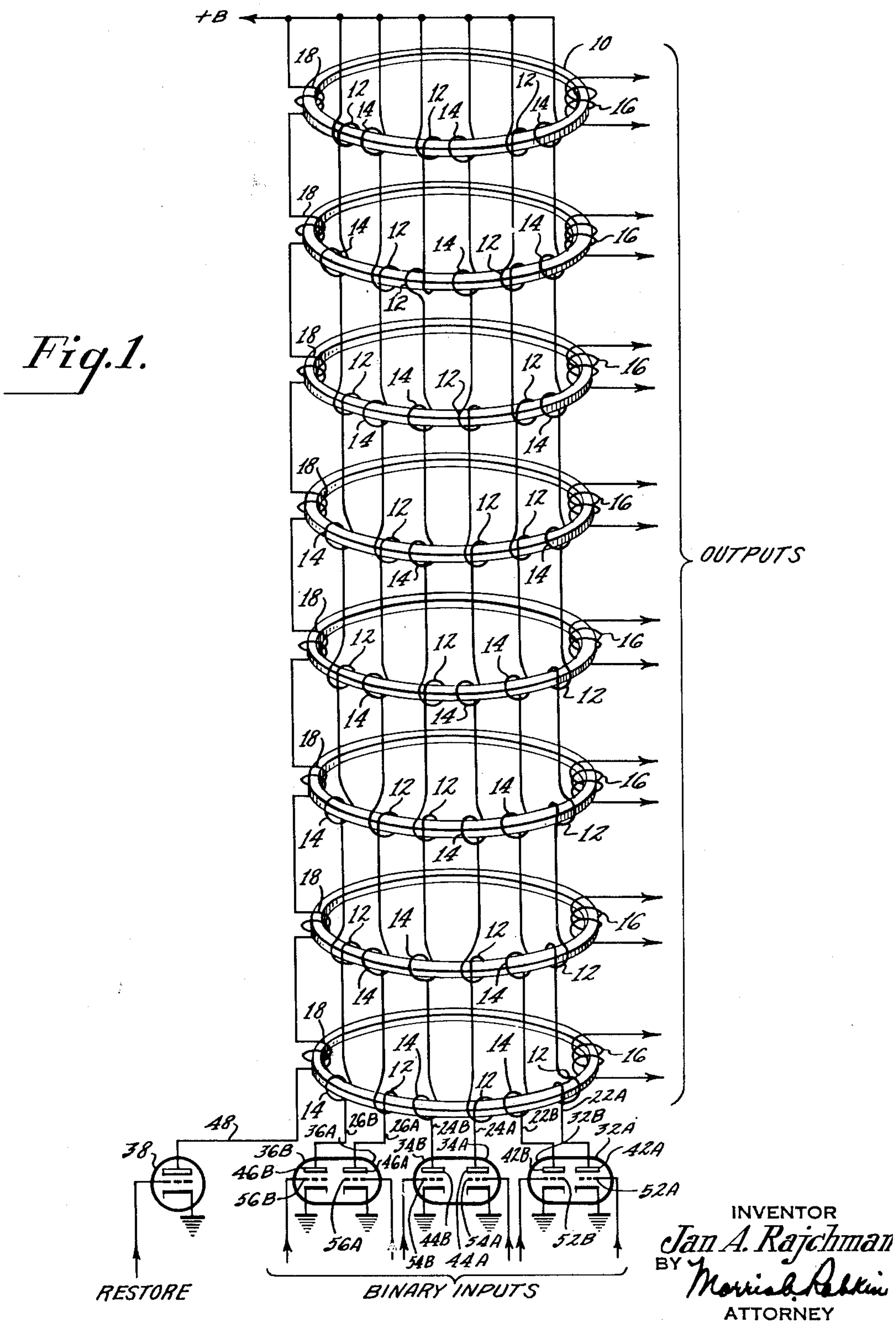

This invention relates to switching devices and more particularly to an improved magnetic switching and translating system.

In an application for a "Static Magnetic Matrix Memory" by this inventor, Serial No. 264,217, filed December 29, 1951, there is described a magnetic switching system in connection with a magnetic matrix. The magnetic matrix memory described in the above indicated application consists of a plurality of magnetic elements. A binary digit or bit of information is represented by the magnetic condition or direction of magnetic saturation of each element. The direction of saturation of an element is altered, as required, in accordance with the information sought to be stored. The elements are usually arranged in columns and rows. Each element has at least two windings on it. A row coil consists of a series connection of one of the windings on all the elements in a row. A column coil consists of a series connection of another of the windings on all the elements in a column. Accordingly, each element in the array is inductively coupled to a row coil and a column coil. Excitation of both a row and a column coil result in the element inductively coupled to both coils having its magnetic condition changed. Accordingly, an element may be selected by excitation being applied to the row and to the column coils which are coupled to that element. A detailed description of a system of this type may be found in an application by this inventor filed on September 30, 1950, Serial No. 187,733, for "Magnetic Matrix Memory"; also in an article by Jay W. Forrester in the "Journal of Applied Physics," January 1951, page 44, entitled "Digital Information Storage in Three Dimensions Using Magnetic Cores."

As pointed out in my application Serial No. 264,217, filed December 29, 1951, in the operation of these magnetic matrix ssytems consisting of $n^2$ elements ($n$ elements on each side of a square array), a switching problem exists consisting of selecting one out of $n$ rows and one out of $n$ columns of elements. If electronic devices are used, since they are unidirectional, for positive and negative writing into the matrix, current must flow in two directions and accordingly $4n$ electronic devices are required for switching. One system for simplifying this switching problem is described in the aforesaid application Serial No. 264,217, filed December 29, 1951. It consists of using a cumulative array of magnetic matrices driving magnetic matrices. A main or information holding matrix array has its row coils and its column coils each inductively coupled to magnetic elements arranged into a row driver array and a column driver array. In turn each of these driver arrays have row and column driver arrays of lower order. The lowest order arrays in a system of this sort may have as few as four elements and, by way of example, with a selection of 16 out of 32 possible inputs, ready access is obtained to each element in a central information holding matrix having 65,532 magnetic elements.

While the cumulative matrix switching system simplifies the switching problem considerably, it requires a great number of magnetic elements to do so. This adds to the expense of the equipment. Further, in view of the inductive cascade coupling of the cumulative arrays, the speed of switching is limited.

An object of the present invention is to provide a new and improved magnetic switching system.

A further object of the present invention is to provide a simple magnetic switching system using fewer elements than heretofore.

A still further object of the present invention is to provide an inexpensive magnetic switching system.

Yet another object of the present invention is to provide a novel and useful general purpose magnetic switching system.

These and further objects of the invention are achieved by employing a plurality of magnetic elements in the shape of torodial cores and a plurality of coils. Each of the coils is inductively coupled to different ones of the magnetic elements, by windings, in accordance with a desired combinatorial code, such as binary. Each element has an output winding. Means are provided to apply current selectively to said coils so that, when all the windings, which are wound in the same sense, on a desired one of said plurality of elements are excited, the magnetic condition of only that one element is altered. In being driven in this fashion a voltage is induced in the output winding of the element selected. To restore the element to its initial magnetic condition, a restoring coil is employed. This comprises a winding on each element. All these windings are connected in series. A current is applied to this restoring coil and all the magnetic elements are restored to their starting condition. The means for applying currents to these coils may be electron discharge tubes or other magnetic elements driven by electron discharge tubes. The voltages induced in the output windings of selected elements may be utilized for any purpose desired.

Figure 2:
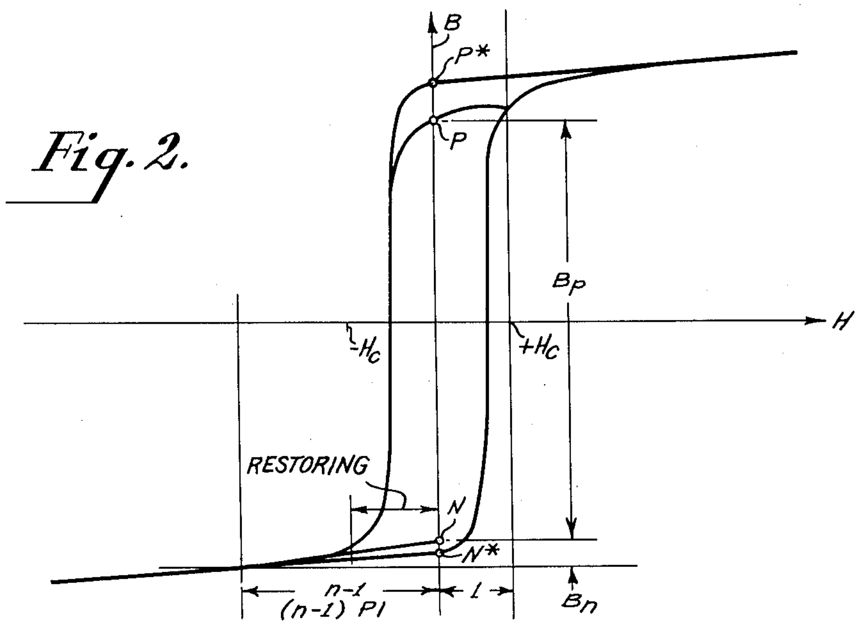
Figure 3:
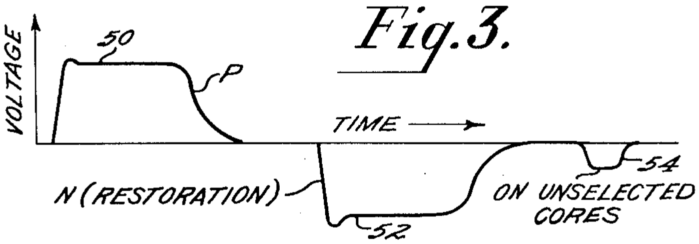
Figure 4:
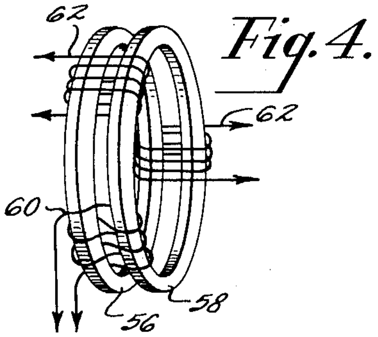
Figure 5:
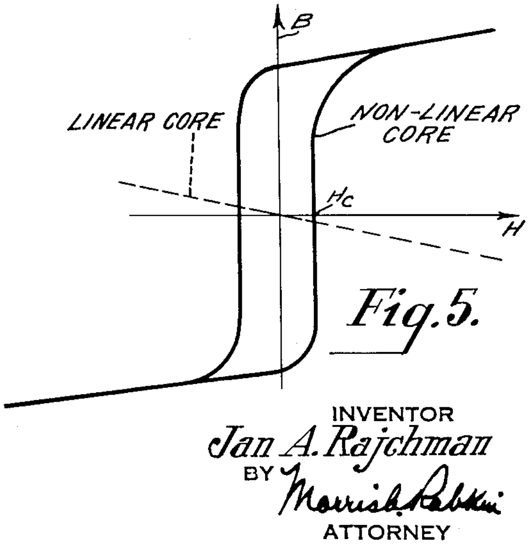
Figure 6:
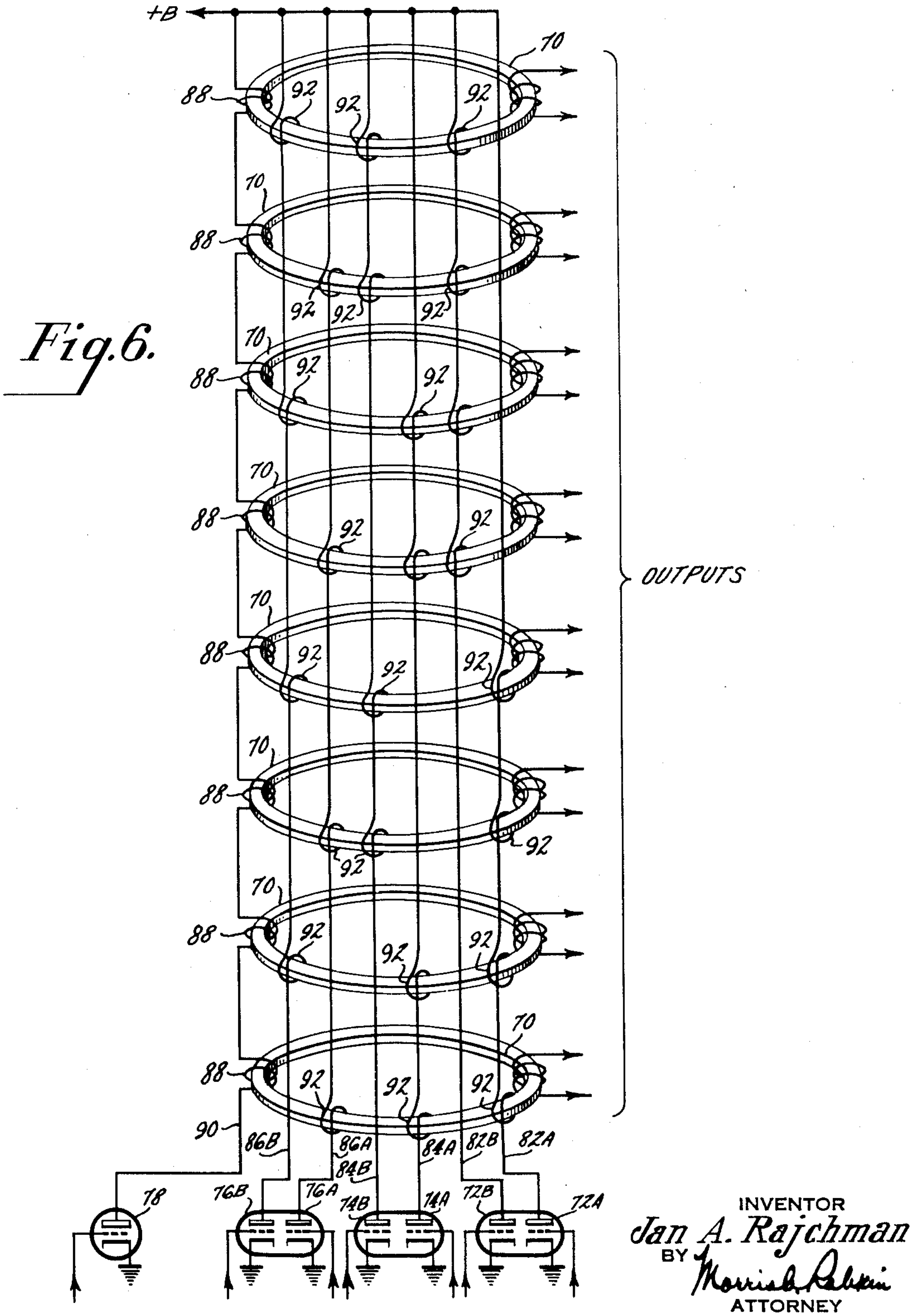
Figure 7:
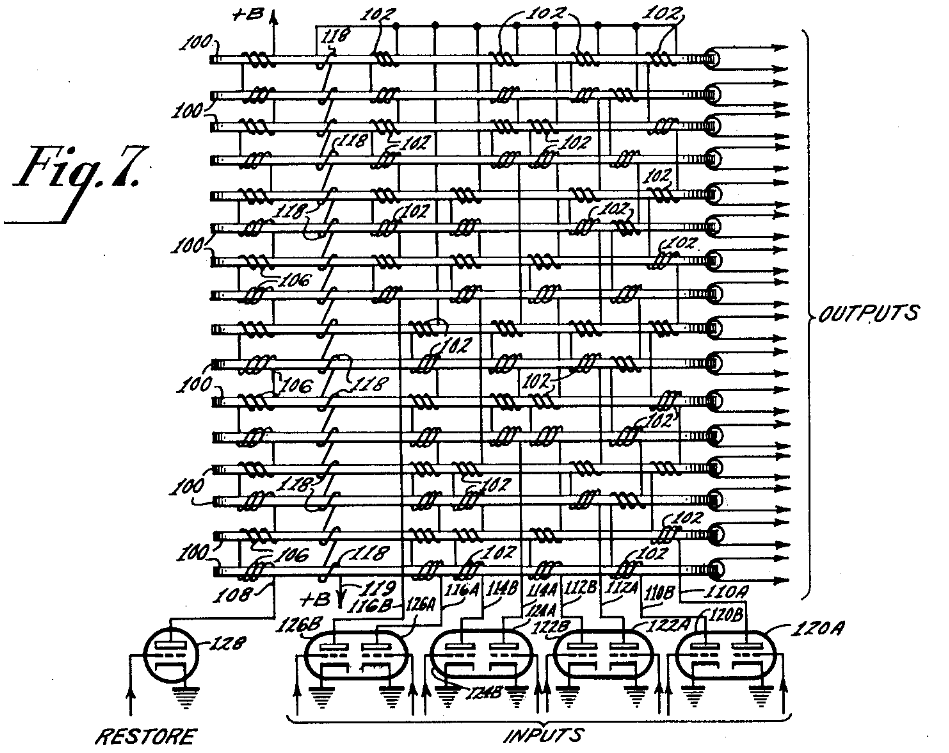
Figure 8:
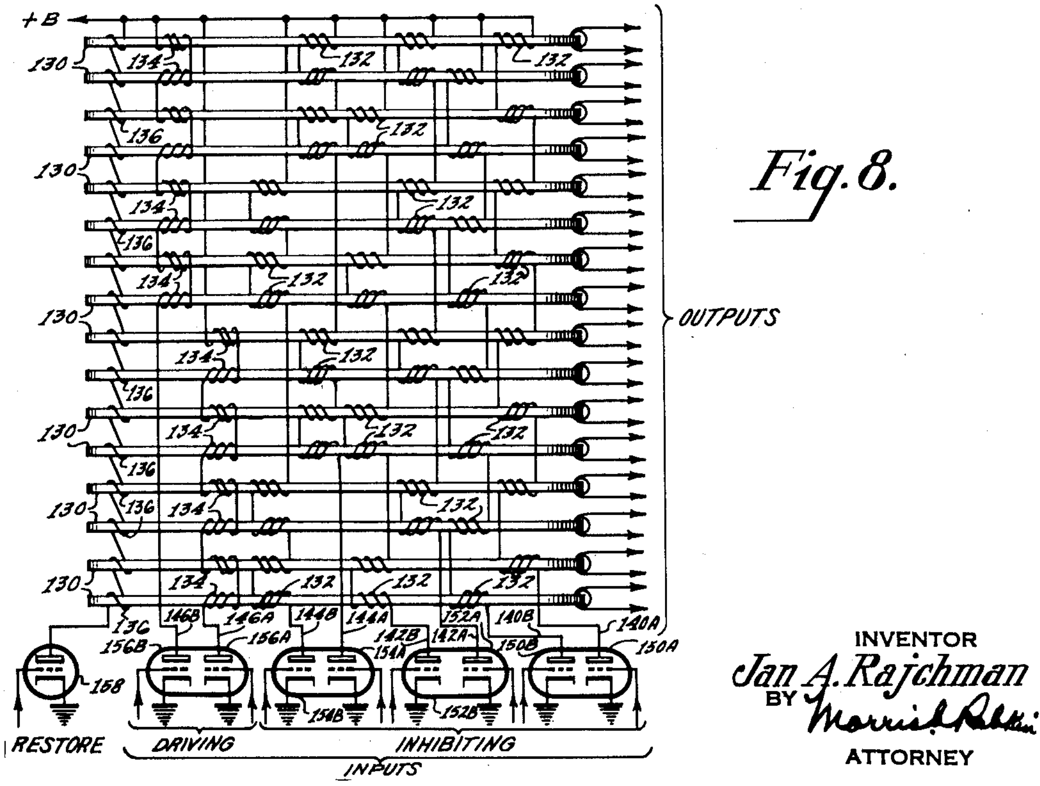
Figure 9:
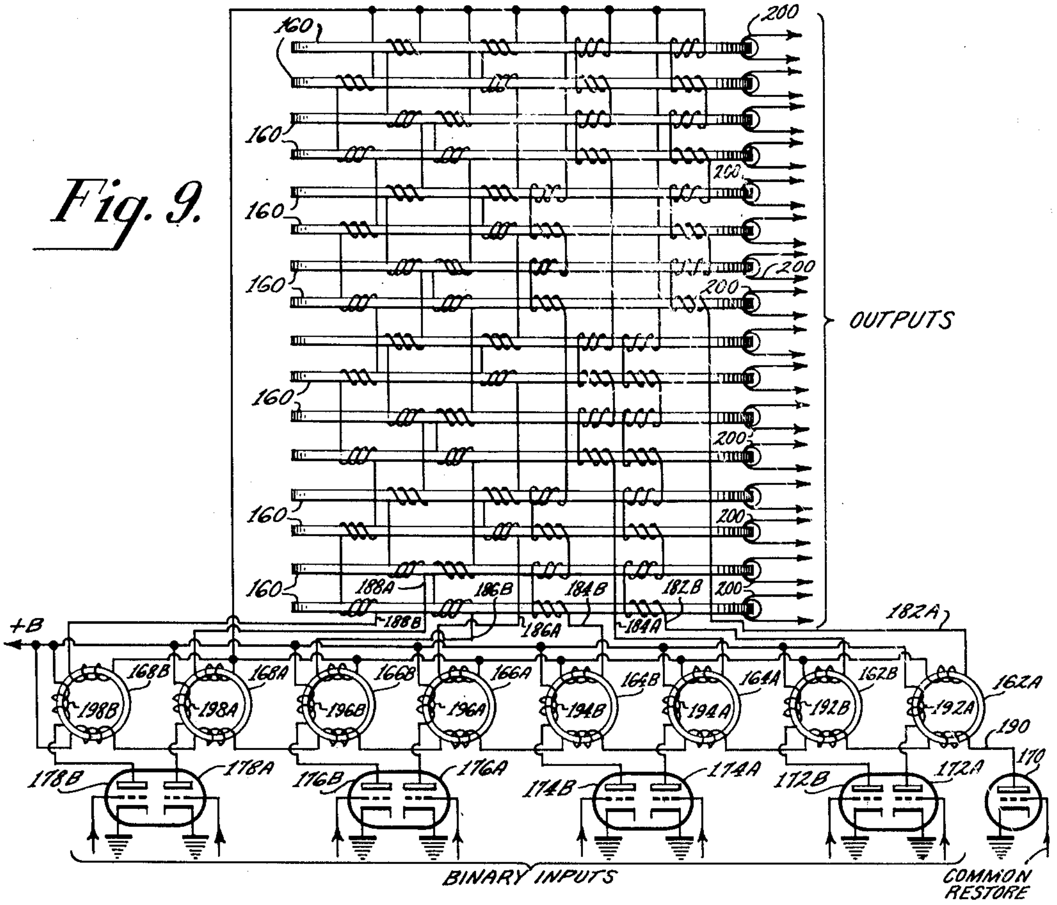
Figure 13:
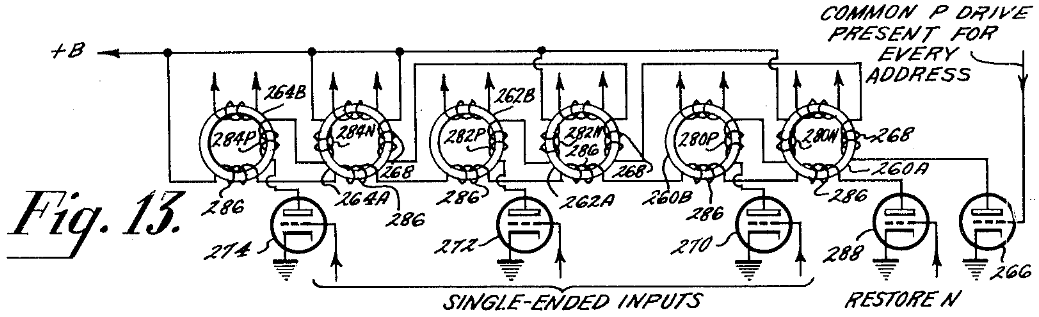
Figure 14:
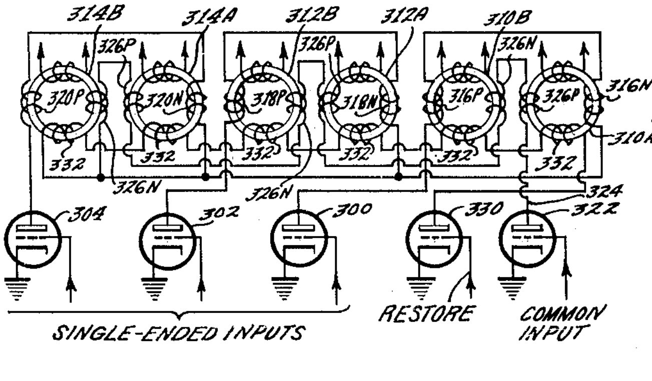
Figure 15:
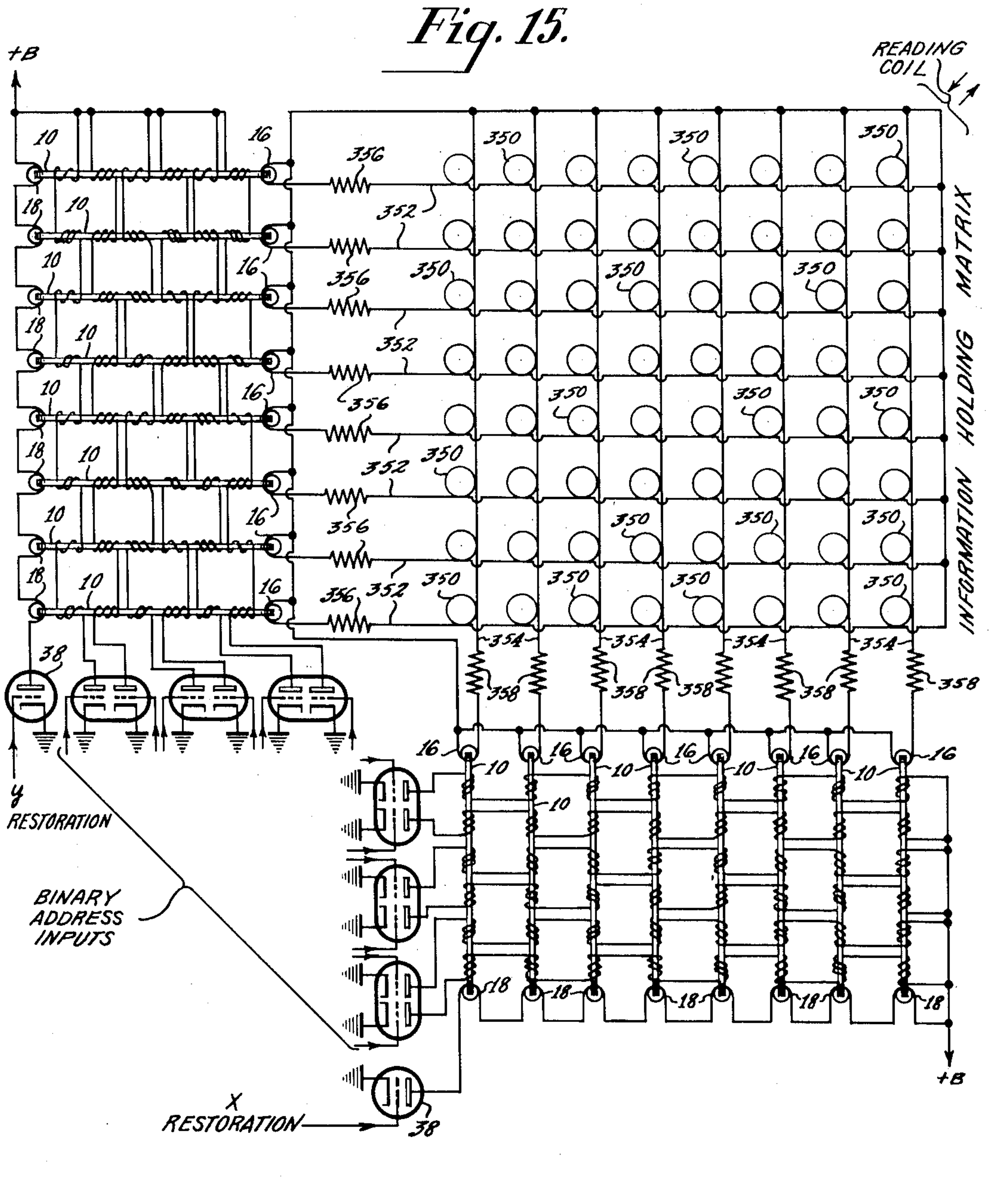
Figure 16:
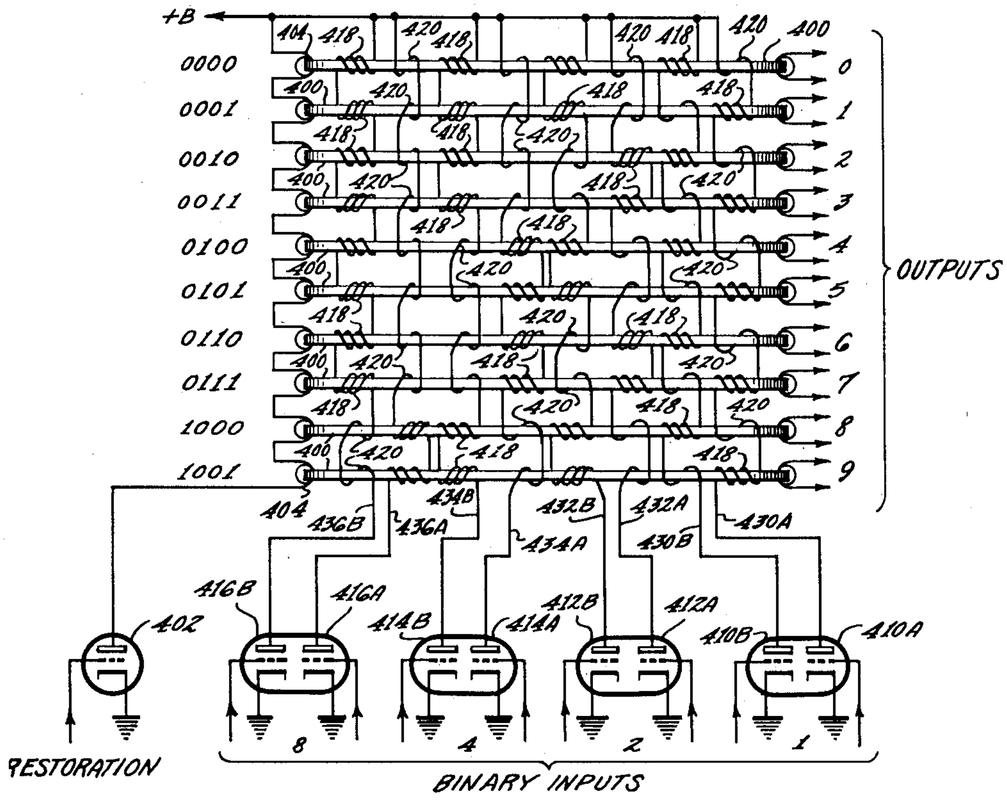

The novel features of the invention as well as the invention itself, both as to its organization and operation, may best be understood by referring to the accompanying drawings, in which Figure 1 is a schematic drawing of one embodiment of the invention, Figure 2 is a hysteresis curve which is shown to assist in explaining the invention, Figure 3 is a waveshape diagram obtained as output from the magnetic switch shown in Figure 1, Figure 4 is a schematic drawing of a noise elimination system which is a feature of the invention, Figure 5 is another hysteresis curve which is shown to assist in explaining the operation of the noise elimination feature, Figures 6, 7 and 8 are schematic drawings of other embodiments of the invention, Figure 9 is a schematic diagram of an embodiment of the invention being driven by a magnetic system, Figures 10, 11, 12, 13 and 14 are schematic diagrams of magnetic driving systems, Figure 15 is a schematic drawing of an embodiment of the invention driving a magnetic matrix memory, and Figure 16 is a schematic drawing of an embodiment of the invention connected as a translator from a binary coded decimal to a straight decimal code.

Referring now to Fig. 1, there is shown a schematic diagram of one embodiment of the present invention. There are shown in perspective eight saturable toroidal shaped cores 10 or elements of magnetic material. This is not to be construed as a limitation, since any number of cores required may be used. Each core has wound thereon a number of separate windings 12, 14, 16, 18. The purposes for these windings will be subsequently shown. Considering the saturable cores 10 of magnetic material, the problem of selecting one among them, or switching to a core, will be defined as consisting of driving a core to one direction of saturation which may be arbitrarily referred to as the P direction; while all the other cores remain saturated in the opposite condition of magnetization, which may arbitrarily be referred to as the N direction. In the standby or unselected stage, all the cores are held in the N condition of saturation. When one of the elements is selected it is driven to the condition P and the others are left at N.

Referring again to Fig. 1, there are shown six switching electron tubes 32A, 32B, 34A, 34B, 36A, 36B consisting of three "address" input pairs and one "restore" electron discharge tube 38. The anodes 42A, 42B, 44A, 44B, 46A, 46B of each of the address tubes are connected respectively to eight windings 12, 14 in series, one on each core 10. Each of the eight windings in series is referred to as a coil 22A, 22B, 24A, 24B, 26A, 26B. Of the eight windings in series, half 12 are wound so that when the tube draws current the element associated therewith will tend to be driven in the P direction and the other half 14 are wound so that with tube current being drawn through the winding an element will tend to be driven in the N direction. The pattern of P and N windings for each coil connected to each pair of tubes are opposite so that one tube of the pair is connected to a P winding on an element where the other tube of a pair is connected to an N winding. A first pair of coils 22A, 22B has half its windings in one sense on half the elements and half of its windings in the other sense on the other half of the elements. The next pair of coils 24A, 24B has the sense of windings made so that they are on interleaving quarters of the elements. The third pair of coils 26A, 26B has the sense of its windings made so that they are on interleaving eighths of the elements.

This type of connection is simply determined by writing the binary ordinal numbers 000 to 111, and, for every core, determining one sense of winding or the other for the windings of the three pairs according to whether the digit is zero or one for the binary number corresponding to that core and that pair.

Each core also has wound thereon an output winding 16. This may be connected to any other device to utilize the output induced therein when the core is driven from one state of magnetic saturation to the other.

Still another winding 18 is provided on each core which is in the N direction. This winding 18 on every core is connected in series as an N restore coil 48 which in turn is connected as the complete load of the restore tube 38.

In operation, signals are applied to the grids 52A, 52B, 54A, 54B, 56A, 56B of the address tubes 32A, 32B, 34A, 34B, 36A, 36B, which signals correspond to the address of the core 10 it is desired to drive from the N to the P condition. The core which has all of its P windings 12 excited simultaneously will be driven from N to P. The remaining cores which do not have the three P windings excited simultaneously will not be so driven. To restore the magnetic element the restore tube 38 is excited and all the elements are driven in the N direction, including the one which was in condition P. Accordingly, by the application of a multicoincidence of excitations, it is possible to drive only one core but not the others. It should also be noted that it is possible to drive arbitrarily hard in the direction N the cores which are already at N without affecting the operation of the system or providing any substantial output in the output windings of these cores. Consequently, the operation of the system depends only on the existence of a small slope of the B—H curve of the material in the saturated regions of the curve, rather than on a perfect rectangularity of the B—H loop. As a more specific illustration of the operation of the switch, if signals are applied to the address tubes so that only tubes 32A, 34A and 36A are rendered conductive, then only the lowest core is driven to P since it is the only one on which all its P windings are excited and none of its N windings.

If $N_t$ and $P_t$ are respectively representative of the number of turns on the windings which are in N and P directions and an identical current $$\frac{I}{n}$$

is sent through each of the selected ones of the N pairs of coils ($n=3$ here), the effective exciting currents applied to the various cores may be determined as follows:

There will be one core selected in which all the windings in the P direction have current and no N winding has current. This is the selected core having applied thereto the net ampere turns $I_o=P_tI$. Then there are $2^{n-1}$ unselected cores, having at least one excited N winding. The effective ampere turns applied to these will be given by $$\frac{I}{n}\cdot(P_tK-N_t(n-K))0\geq K\geq n-1$$

where K is the number of P coils on the unselected core which carry current. Of particular interest is the "almost" selected core, $K=n-1$, and the "most" unselected core $K=0$. The effective ampere turns for these are $$\frac{I}{n}((n-1)P_t-N_t)K=n-1 \text{ (almost select)}$$

and $$-IN_t \qquad K=0 \text{ (most selected)}$$

If, now, we choose $N_t=(n-1)P_t$, it is clear that the "almost" selected core will have zero excitation, while all other cores will have variable amounts of excitation in the N direction, the "most" unselected one having the most or $(n-1)$ times the excitation of the selected cores but in the N direction. Now, if the cores in state N were perfectly saturated, i. e., the $dB/dH=0$ for points on the lower left of a B—H loop, all unselected cores being at N can not change their flux when driven towards N.

Actually, because of the finite slope of a B—H curve, a slight change of B will occur when the cores are driven towards N. This is illustrated in Figure 2, which represents a typical hysteresis curve. When a core is in state N (or N*) and is selected, it is driven to a state P following a "minor" hysteresis loop, as illustrated. This produces an effective change of flux density $B_p$. At the same time, the unselected cores are driven various amounts (from zero to $(n-1)$ times the excitation of the selected core) towards N. This produces a momentary change of flux density whose maximum is $B_n$. This drive towards N will leave the cores at some point between N and N* depending upon the particular minor loop followed. The restoring pulse sent through the series windings will drive the selected core from P to N if the restoring is of the same intensity as the drive (or to some point near N if it is stronger). It is clear that $B_n$ can always be made smaller than $B_p$ for materials with reasonably non-linear B—H characteristics.

The voltages induced in the output windings as a result of the drives applied to the magnetic switch shown in Figure 1 may have the shapes illustrated in Figure 3. Upon application of a step-function current excitation, the voltages induced when going from N to P or P to N will be symmetrical. The first curve 50 shows the voltage obtained in going from N to P. The second curve 52 shows the voltage obtained in going from P to N. The third curve 54 is the waveshape of the voltage derived from the unselected cores. The shape of the voltage pulse is influenced greatly by eddy current effects which tends to oppose the magnetomotive driving force. Because the effective damping due to eddy currents is greater for a greater flux change, the ratio of maximum amplitudes of the desired to undesired signal appearing in the unselected cores is less than the corresponding changes of flux densities $B_p$ and $B_n$. However, the areas under the voltage pulses are proportional to these changes of amplitude. If the voltages induced in the windings are used to drive an information holding a magnetic matrix, the pulses in the unselected cores may be tolerated, even though their amplitude is not negligible, because they are of a duration much shorter than the reversal time required by the main matrix cores (if the materials of the driving and information holding cores have the same eddy current effects).

It may become desirable to eliminate the "noise" or unwanted output pulse signals in the unselected cores. A system for performing this elimination is shown in Fig. 4 of the drawings. Therein are shown two magnetic elements 56, 58, one of which, 56, represents an element of a switch of the type shown in Figure 1. The other element 58 is a core having a linear B—H relationship. This core is chosen to have (1) a relatively low permeability, (2) a characteristic which corresponds to that portion of the B—H loop of the saturable material which is obtained for high values of H, and (3) a linear initial magnetization characteristic. Fig. 5 is representative of a hysteresis curve for the non-linear characteristic cores used in a switching system, which has a dotted curve superimposed thereon. This dotted curve is representative of the desired characteristics for the coupled magnetic element 58. To obtain such characteristics a coupled core 58 may be fabricated from powdered ferrite material, for example. The coupled core cross-section is adjusted so that the voltage induced in the winding 60 which couples both coils is equal and opposite to that induced by a saturable core 56 in the output winding 60 when the core 56 is driven in the partially saturated direction. The output winding 60 for the saturable core is coupled to both cores but is wound in the opposite direction on the linear core. Accordingly, substantially no voltages are induced in the output winding when the saturable core is partially driven, as occurs when another saturable core is selected. The output voltage obtained from a selected core is only slightly less than it is without any linear core coupled thereto. It should be noted that the input driving windings 62 couple both cores and are wound in the same direction on both cores. If every one of the cores 10 shown in Fig. 1 has a linear core 58 coupled thereto, in the manner shown in Figure 4, then the switch shown in Fig. 1 will not have any noise voltages in the output windings. Neutralization can also be obtained without an auxiliary core by a system of air coupling. In that case, the area of coupling or effective number of coupled turns in air will have to be of a sufficient size to obtain a cancellation voltage corresponding to that provided by the core 56 in being driven in the saturation regions.

In the embodiment of the invention shown in Figure 1, it was stated that the number of turns of the N driving windings 14 can be made equal to $(n-1)P_t$, in order that the most selected core have no signal. It may be desirable in some cases to use more turns in order to overcompensate the P drive and produce a small N signal in all unselected cores. This is possible without any detrimental effect on the signal from the selected core. Conversely, if the number of turns on the N windings 14 is made less than $(n-1)P_t$, there will be, in general, a positive signal on some unselected cores and a negative signal on others. The maximum absolute magnitude of the noise can be made smaller by a judicious choice of the N winding turns, particularly when the material has a fairly rectangular hysteresis loop so that a fractional excitation in the P direction has a negligible effect.

Referring now to Figure 6, another embodiment of the invention is shown which requires fewer windings and has certain other advantages which are not found in the embodiment shown in Fig. 1. In the embodiment of the invention of Fig. 6 again eight cores 70 of magnetic material are shown by way of illustration, each preferably having substantially rectangular magnetization characteristics. Three pairs of electron discharge tubes 72A, 72B, 74A, 74B, 76A, 76B, are used for the address and one tube 78 is used for the restoration. Each one of the tubes has a coil 82A, 82B, 84A, 84B, 86A, 86B, as its anode load. In the case of the restoration tube 78 a winding 88 in the N direction on every one of the cores is connected in series as the plate load coil 90 for the tube. In the case of the address tubes their anode loads consist of coils 82A, 82B, 84A, 84B, 86A, 86B having windings 92 which are wound with a sense to provide a magnetomotive drive in the P direction. The system for the cores and windings is the same one as that used in the embodiment shown in Fig. 1, except that no N windings are used. By writing down next to each core the binary digit numbers 000 to 111 and providing a P winding wherever a one occurs, the system shown in the drawing is obtained. Accordingly, each tube has four windings 92 connected in series as its complete load. The first pair of coils 82A, 82B have the four windings 92 coupled to different halves of the elements. The second pair of coils 84A, 84B are coupled by the windings to the elements in interleaving quarters. The third pair of coils, 86A, 86B are coupled to the cores in interleaving eighths. In the operation of the system shown, address signals are applied to the control grids of the driver tubes 72A, 72B, 74A, 74B, 76A, 76B. One tube in each pair is rendered conductive. The N restoring tube is also made to conduct with the driver tubes. The current is thus sent simultaneously through the N restoring coil as well as through the three coils which are selected. The selected core accordingly has $n$P excitations ($n=3$), and one N excitation due to the common line. This excitation therefore is $$nP_tI_p-N_tI_c=I_o$$

the most "selected" core of the unselected cores has an excitation, $$(n-1)P_tI_p-N_tI_c$$

and the most unselected one of the unselected has an excitation $$-N_tI_c$$

$I_p$ is the current through the P windings, $I_c$ is the current through the N windings. If we equate the excitation of the most selected core to zero, we find that $$P_tI_p=I_o \text{ and } N_tI_c=(n-1)I_o$$

Consequently, the most unselected core has $(n-1)$ times the opposing excitation of the selected core just as in the first modification. While the number of windings is reduced in this modification, the required excitations are greatly increased. Indeed, $I_p=I_o/P_t$, while it was only $I_o/nP_t$ in the first modification. This required $n$-fold increase in the current comes about, of course, from the necessity to counteract an opposing drive in the selected core. Restoration is obtained by driving only the N restoring coil. The N restoring coil is driven both when selecting and when restoring, so that programming is somewhat simpler.

The number of turns required on the cores grows with the number of binary places. There are $n$ turns wound in the N direction of each core (1st modification) each with $(n-1)P_t$ turns (for zero signal in the most selected of the unselected cores), as well as $n$ cores with $P_t$ turns. In all $nP_t+n(n-1)P_t=n^2P_t$ turns. For a given current capability of the driving tubes, the number of turns $P_t$ required in the P coils is inversely proportional to the number of binary places, since the tubes of all binary places contribute to the excitation of the selected core. Consequently, the total number of turns required on each core grows linearly with the number of binary places.

Referring now to Fig. 7, there is shown another embodiment of the present invention. For simplicity, the toroidal cores 100 are shown edgewise in plan view instead of in perspective as heretofore. This embodiment of the invention resembles that shown in Fig. 6. The same binary winding scheme is followed except that all the driver windings 102 are wound to have a sense such that when the driver coil of coils 110A, 110B, 112A, 112B, 114A, 114B, 116A, 116B in which the winding is connected is excited, the magnetomotive force established tends to drive the magnetic elements to saturation in a direction N. The restoration coil 108 consists of a series of windings 106 on each of the cores 100 which are in the direction N. An additional winding 118 is placed on each element which is in a sense to provide a magnetomotive force in a direction P. Each one of the N windings 102 on an element has *n* (four) times the number of turns of a P winding. The P winding 118 on every element is connected in series to form a P coil 119. One end is joined to one end of all of the N driver coils. The other end of the P winding is connected to a source of B+. Selection for magnetization is obtained by applying address signals so that one of each pair of the electron discharge tubes 120A, 120B, 122A, 122B, 124A, 124B, 126A, 126B, to which the combinatorially interconnected windings are connected as a plate load is rendered conductive. The current drawn by the *n* (four) tubes through their four coil plate loads also passes through the single P coil 119. Thus a force in a direction P is applied to every magnetic element. One of the magnetic elements will not have a drive in a direction N and that is the one which is selected and driven to P. Since the current supplied to each one of the N coils also passes through the P coil, the current through the P coil is *n* (four) times that of any one of the N coils. Accordingly, the number of turns of the P winding are somewhat less than $1/n$(¼) times the N winding turns in order not to override the N maintaining magnetomotive force on the unselected elements. For the purpose of restoration of the magnetic elements to a condition N, the N restore coil 108 and its driving tube 128 is provided. To restore a core to the condition N a signal is applied to the N restore tube 128 to render it conductive and draw current through the N restore coil 108.

Fig. 8 is a drawing of still another embodiment of the present invention. Here, a plurality of windings is provided on each one of the magnetic elements and interconnected in combinatorial fashion in the manner shown and described in Figs. 6 and 7. However, the windings 134, which are connected to form the highest order pair of coils 146A, 146B (each coil of said pair being coupled to half of the total number of elements; said half consisting of adjacent elements), are of a sense to drive the elements in a direction P. All other windings 132 are of a sense to drive the elements in a direction N. Each of the coils is driven by an electron discharge tube 150A, 150B, 152A, 152B, 154A, 154B, 156A, 156B to which it is coupled as a plate load.

Address signals are applied to the control grids of the tubes 150A, 150B, 152A, 152B, 154A, 154B, 156A, 156B, so that one of each pair of tubes is rendered conductive. The one of the highest order coils 146A, 146B selected applies P driving forces to the elements to which it is coupled. Inhibiting forces are applied by the ones of the lower order coils 140A, 140B, 142A, 142B, 144A, 144B selected to all but one of the elements in the one half of all the elements being excited by the P driving forces. That one element is driven to P and provides an output pulse in its output winding. Restoration is obtained by exciting the restore tube so that current is drawn through the N restore coil connected to the tube anode.

Essentially the embodiments of the invention shown in both Figures 7 and 8 of the drawings are operated by applying P drives to some or all of the elements and applying inhibiting currents to all but one of the elements to which a P drive is applied. This one element is driven to P. The N restore coil and tube may be eliminated in both these embodiments of the invention and the N restore function carried out by signals to both halves of the pairs of tubes connected to the N driving coils.

For many binary inputs, the number of turns for each winding required on each core may become so large as to limit the speed of operation. The capacity shunting effects between turns of the windings increase in importance as the number of turns increases, and cause effective decrease of instantaneous drive and may also cause resonant oscillations. To keep the number of turns low, it is necessary to use high excitation currents and thereby use inefficient vacuum tube drivers.

The use of a transformer to couple vacuum tubes to a load, such as the N and P driver coils, would permit efficient utilization of the vacuum tubes by providing a better impedance match. If the vacuum tubes are used to drive saturable cores which in turn are used to drive the coils, the total number of turns on each core in the switch can be reduced because this system permits the elimination of N windings on the cores. This may be seen by reference to Figure 9, wherein there is shown a schematic diagram of an embodiment of the invention with a drive consisting of magnetic cores 162A, 162B, 164A, 164B, 166A, 166B, 168A, 168B similar to the ones 160 being driven. A plurality of saturable substantially rectangular hysteresis characteristic cores 160 are driven (sixteen shown by way of example) by four pairs of magnetic cores also having substantially rectangular hysteresis characteristics. Each of driving cores 162A, 162B, 164A, 164B, 166A, 166B, 168A, 168B, in turn is driven by a corresponding one of vacuum tubes 172A, 172B, 174A, 174B, 176A, 176B, 178A, 178B to which address signals are applied. Another vacuum tube 170, aside from the four pairs driving each one of the driving cores, is used as a common N restoration tube. The driver vacuum tubes drive the driving cores by means of coils 192A, 192B, 194A, 194B, 196A, 196B, 198A, 198B, connected to the anodes of the tubes and inductively coupled to the associated driver core. The common N restore tube 170 has a coil 190 as its plate load which is inductively coupled to all the driver cores. The sixteen driven cores 160 each has an output winding 200 connected thereto. Each core 160 is also inductively coupled in combinatorial fashion to four out of the eight driving coils 182A, 182B, 184A, 184B, 186A, 186B, 188A, 188B, all of which have the same winding sense. A driven core 160 is selected when all four of the windings in the four coils to which it is inductively coupled are excited by a current which provides a magnetomotive force in the P direction. The combinatorial code used for coupling the driver coils 182A, 182B, 184A, 184B, 186A, 186B, 188A, 188B, to the driven cores 160 is a binary one. The magnetic driving system accordingly consists of the first pair of driver magnetic elements 192A, 192B which is coupled to two coils 182A, 182B, each of which is inductively coupled to the alternate half of the total number of driven cores in which the cores are adjacent to each other. A second pair of driving cores 194A, 194B drives the driven magnetic elements 100 through two coils 184A, 184B which are inductively coupled to alternate quarters of the driven cores. The third pair of driving cores 196A and 196B are inductively coupled to two coils 186A and 186B which are inductively coupled to alternate eighths of the driven cores. The last pair of driver cores 198A and 198B drives two coils 188A and 188B which are inductively coupled to alternate sixteenths of the driven cores. The ordinal binary numbers of the cores can be used, as previously indicated, to determine to which side of the coil pair being considered a given driven core is to be coupled.

The operation of the switching system is as follows: Assume first all cores to be at N. Then, one of each input pair of tubes is selected, such as tubes 172A, 174A, 176A, 178A, and all selected tubes are made to conduct simultaneously. This causes the associated four driving cores 162A, 164A, 166A, 168A to be driven from N to P. The particular one of the ($2^n=16$) driven cores coupled by the coils 182A, 184A, 186A, 188A, to the ($n=4$) driving cores, which are turning over, will also turn over from N to P. This is the selected core. In this instance it is the uppermost core. The unselected driven cores 160 will be coupled to K driver cores (192B, 194B, 196B, 198B), which are saturated at N and are not tube driven, as well as to $(n-K)$ driver cores which are driven. The driving currents in the $(n-K)$ windings tend to magnetize the unselected driven cores from N towards P. However, as soon as a slight change in induction is produced, currents are induced in the windings coupled to the driving cores which are not being turned over from N to P. Since these driver cores are saturated (in state N), the effective impedance of the windings is very low and consequently the induced damping currents are very high (the higher, the greater the tendency of the flux to reverse). Consequently, the unselected cores 160 will not turn over from N to P. Their state of magnetization will change slightly because the coupling windings do not have zero impedance, but have some inductance due to the finite $dB/dH$ slope of the magnetizing curve near the saturated regions.

In order to restore the driven cores to their N condition, the common restore tube 170 has a pulse applied whereby all the driver magnetic elements 192A, 194A, 196A, 198A are simultaneously driven to N and the selected element or driven element 160 in condition P is restored to condition N.

Figure 10:
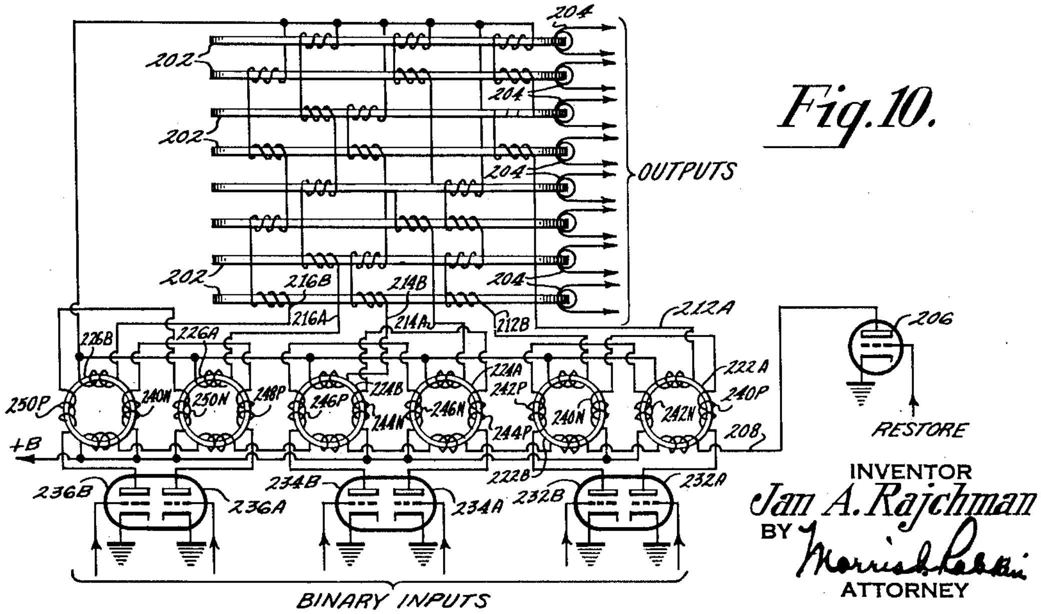

Referring now to Figure 10 of the drawings, there is shown a schematic diagram of an embodiment of the invention employing another driving system for the driven cores. For simplicity, only eight driven core elements 202 are shown being driven by six driver cores 222A, 222B, 224A, 224B, 226A, 226B. The driving coils on the driven cores are arranged in the same combinatorial system as was used in Figure 9. The driving system consists of three pairs of driver magnetic elements having substantially rectangular hysteresis characteristics. Each of the driver elements 222A, 222B, 224A, 224B, 226A, 226B is driven by an electron discharge tube 232A, 232B, 234A, 234B, 236A, 236B. One common restore tube 206 is coupled to restore each one of the elements to its N condition by a common N coil 208 inductively coupled to each driver core by a winding on each element. Each of the tubes has a coil as its plate load which consists of a P winding 240P, 242P, 244P, 246P, 248P, 250P, on one element in series with an N winding 240N, 242N, 244N, 246N, 250N on the other element of the pair. Accordingly, when any one of the tubes draws current it will turn over the associated driver element in the direction P while applying a magnetomotive force to the other element of the pair to maintain it in the condition N. This action improves the ratio of desired to undesired output signal in the system shown, since any currents induced in the driver coils by any unselected cores which may have a tendency to go to P as a result of excitation in one of the driver coils coupled to that element are forcefully counteracted by the N maintaining magnetomotive force being applied to the nonselected driver cores. In effect, any unselected windings which are coupled to a selected driver core become better than a "short" since an opposing voltage is induced in it.

Figure 11:
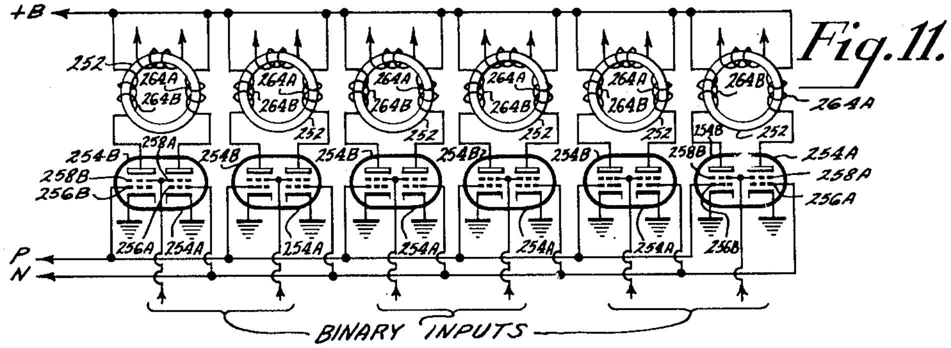

Figure 11 is a circuit diagram of another driving system. The system shown in Figure 11 is a simple, direct, push-pull drive, in which restoration to N is obtained by an individual tube for each of the driver elements. As shown, there are six magnetic driver elements 252, each element having a pair of tubes 254A, 254B associated therewith. One tube 254A when rendered conductive serves to drive the associated driver element to P, the other tube 254B when rendered conductive serves to drive the associated element to N. Each tube has a first and a second control grid 256A, 256B, 258A, 258B. The P drive 254A tubes have their first control grids 256A connected to a source of P pulses, the N drive tubes 254B have their first control grids 256B connected to a source of N pulses. The second control grids 258A and 258B of each pair of tubes is connected together. Address signals in the form of binary input signals are applied to the second control grids 258A and 258B. The P or N signal applied to the first control grids 256A and 256B determines which of each pair of tubes, which has been primed by the address signal, is to become conductive. A P drive tube 254A has a coil 264A as its plate load which applies a magnetomotive force to the associated driver element to drive it in a direction P. An N drive tube 254B has a coil 264B as its plate load which applies a magnetomotive force to the associated driver element to drive it in a direction N. Each of the driver magnetic elements is inductively coupled to a driver coil (shown vestigially) in the manner shown and described in Figures 9 and 10. The system shown is a symmetrical one, but requires a pair of tubes for each core with two control grids for each tube.

Figure 12:
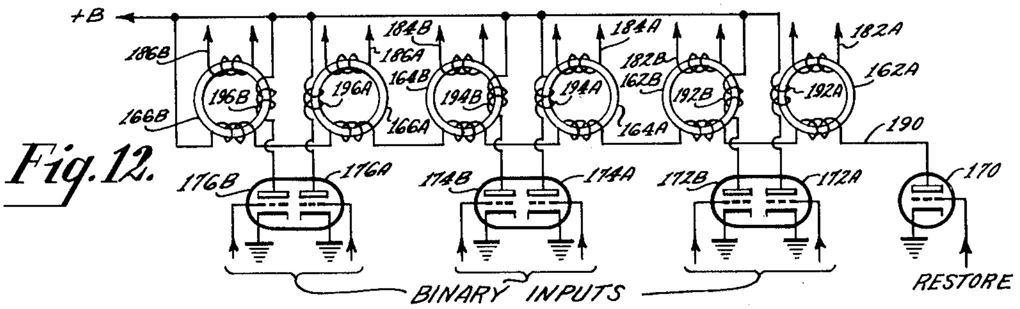

Reference is now made to the system shown in Figure 12. This system is the same as the driving system shown in Figure 9. It is reproduced again to better permit comparison with the other driving systems shown in Figures 11 through 14. It is more conservative in the use of driving tubes than the system shown in Figure 11, but less so than the following systems. One tube is associated with each magnetic driver element for the application of P driver signals. One tube is associated with all the elements for the application of N driver signals, instead of one for each element as shown in Figure 11. The selection of a driver core is made by rendering conductive the one of the tubes in each of the three pairs of tubes by means of address signals applied to the tube grids. This in turn drives to a condition P one driver core in each pair.

Still another driving system may be seen by reference to Fig. 13 of the drawings. This system uses still fewer address electron discharge tubes than are used in the systems shown in Figures 11 and 12. The magnetic driver elements 260A, 160B, 262A, 262B, 264A, 264B in Figure 13 are arranged in pairs. There is one tube 266 which has the function of providing a common P drive which is present for every address. This P drive tube 266 has a coil plate load which is coupled by means of a winding 268 (in the P direction) to one only of elements 260A, 262A, 264A out of every pair of the pairs of driver magnetic elements. Tubes 270, 272, 274 are assigned respectively to the pairs of driver elements and have coil plate loads 280P, 282P, 284P, which are coupled with a P sense to the respective elements 260B, 262B, 264B of the pair of driver elements which do not have common P coil coupling 268 and with N windings 280N, 282N, 284N to the others of the pair of driver cores. Accordingly, whenever address signals are supplied, the common P drive tube is also energized simultaneously. The ones of the address tubes 270, 272, 274 which are rendered conducting, serve to maintain the driver magnetic elements to which their N windings are connected in their N status, and to drive the driver elements to which their P windings are connected to P. Where an address does not render a tube conducting the common P coil serves to apply a magnetomotive force to drive the element of the pair to which it is connected to a condition P. All the elements are coupled by means of N windings 286 of an N restore coil to a common restore tube 288. This serves to restore the elements to their N condition after the application of an address. This system requires only $n+2$ tubes and apparatus with single-ended inputs ($n$=number of pairs=3).

Figure 14 is a circuit diagram of another driving system which is made up of a combination of the systems shown in Figs. 10 and 13. It uses opposing windings to produce voltages in the opposite direction in all unselected cores and also uses the common drive of the single ended inputs. As shown, there are three address input tubes, 300, 302, 304, one for each of the pairs of magnetic driver elements 310A, 310B; 312A, 312B; and 314A, 314B. Each of these tubes is coupled by a plate load coil to one of the elements 310B, 312B, 314B of the pair by one of P windings 316P, 318P, 320P and to the other of the elements, 310A, 312A, 314A by one of N winding 316N, 318N, 320N. A common input tube 322 is coupled to all of the driver elements by a plate load coil 324. More specifically the coil 324 of the common input tube is coupled to first driver elements 310A, 312A, 314A respectively of the pairs by P windings 326P and to the second driver elements 310B, 312B, 314B respectively of the pairs by N windings 326N. The common input coil P and N windings are on those elements which have the N and P windings respectively of the address tubes. The number of turns of the N windings 326N of the common input coils are made less than the number of turns of the P windings 316P, 318P, 320P of the address tube coils so that when an address tube is rendered conductive the drive provided by its P winding overcomes the N drive provided by the common input N winding and turns the driver core to P. A pulse is applied to the common input tube 322 at the same time that an address is applied to the address inputs. The result is that any one of the address tubes which has a pulse applied will maintain the one of the two magnetic elements to which it is inductively coupled with an N winding in the status N, since the P and N drives have a neutralizing effect on each other. The core to which the address tube is coupled with a P winding is driven to condition P. When no pulse is applied to an address tube, the one of the two driver elements in a pair to which the common input is coupled by a P winding, is turned over. A common N restore tube 330 is provided with a common N restore coil 332 coupled to all the driver elements for N restoration.

Referring now to Fig. 15, there is shown a schematic diagram of a magnetic matrix being driven by the system which is an embodiment of the present invention.

A static magnetic information holding matrix may be found described in my application Serial No. 187,733, filed September 30, 1950, or may be of the type described in the article by Jay W. Forrester previously referred to. This matrix may consist of an array of magnetic elements 350 in which the magnetic condition of an element represents information. The rows and columns of elements 350 in the array are coupled respectively to separate row coils 352 and column coils 354. Each row coil 352 of the magnetic matrix is inductively coupled by a winding to every one of the magnetic elements 350 in a row and is connected through a resistor 356 to the output winding 16 of a core in a magnetic switching array. Each element in a column in the matrix is inductively coupled to a column coil 358. This column coil is connected through a resistor 360 to the output winding 16 of a second switch. The row and column coils for the information holding matrix are here represented as a single line tangential to the magnetic core to which it is inductively coupled in order to maintain clarity in the drawing. Each switch consists of a plurality of magnetic elements 10 each of which has an output winding 16 connected to a coil of the information handling matrix. Each driver switch is of the type shown described in Figure 1 of the drawings. The same reference numerals are used to designate the components of the switches as are used in Figure 1. The driver switch which drives the column coils is designated as the X driver, and the switch which drives the row coils is designated as the Y driver. The system shown herein is somewhat similar to the system of driving a central main matrix by means of cumulative driver matrices which is shown and described in my application Serial No. 264,217, filed December 29, 1951. The system of interconnection of the magnetic elements of the X and Y driver switches may be any one of those previously described herein, although the one shown in the drawing is that shown in Fig. 1. Furthermore, the driving means for the driver switches may be any of the magnetic ones described herein. It will be readily appreciated that upon the simultaneous application of address signals to the X driver switch and to the Y driver switch, one of the cores 10 in each driver switch will be driven to P. This causes a simultaneous induction of voltage in a row coil 352 and in a column coil 354 which are coupled to a particular element 350 in the matrix. The magnetic element in the information holding matrix which is coupled to both the row and driver coils in which the voltages are induced will be driven in a direction P. To leave this magnetic element in its P state, the driver switches are restored to their N condition by sequential application of a signal to the N restore tubes 38. To restore a selected element in the central information holding matrix to its N condition, a signal is applied to both the N restore tubes simultaneously.

For the purposes of simplifying the above description, the following table is provided for showing the operation of the information holding matrix using magnetic switches:

TABLE I

*Successive X and Y restoration*

| Operation Desired in Selected Core of Main Matrix | X and Y Inputs to Binary Addresses X and Y | Magnetic Switches Restoration | |
|---|---|---|---|
| | | X | Y |
| Write P: | | | |
| Step 1 | P | — | — |
| Step 2 | — | N | — |
| Step 3 | — | — | N |
| Write N: | | | |
| Step 1 | P | — | — |
| Step 2 | — | N | N |
| Interrogate: | | | |
| Step 1 | P | — | — |
| If signal, Step 2 | — | N | N |
| If no signal— | | | |
| Step 2 | — | N | — |
| Step 3 | — | — | N |

Interrogation is provided by means of a reading coil, not shown, which is coupled to every element in the matrix memory. When an element which is in condition N is driven to a condition P a voltage is induced in the reading coil. If the element being queried is in condition P, then no output is obtained in the reading coil. The reading coil is not shown, to maintain simplicity in the drawing.

A resistance 352, 356 is shown as being inserted in series with each driving winding of the magnetic switch and the corresponding line of the information holding matrix. This resistance is usually used in order that a substantially constant current drive be obtained from a voltage drive. The voltage $e$ on the driving winding should be divided into a fairly large part $e_R$ across the resistance and a small part $e_M$ across the matrix. When this is the case, the variation of $e_M$ resulting from the voltage induced in the lines should the selected core change direction of magnetization, will be small compared to the voltage $e_R$. Consequently, the current $i=e_R/R$ will remain substantially the same whether the selected core is changing or not its direction of magnetization. This resistance may be omitted (made zero) when there is sufficient inductance due to the lines of the information holding matrix.

The reaction of the information holding matrix back to the switch may be neglected provided that the switch be overdriven (i. e., the selected core in it driven sufficiently strongly in the P direction so that the N reaction from a matrix coil should not diminish the drive below the threshold value for turn-over). Consequently, the requirements are less severe than they were in the case of a matrix driven by a matrix where the parameters are adjusted so as to preserve good discrimination in both the driving and information holding matrices. The switches shown and described herein may be used to drive a number of parallel information holding matrices of the type described in the article by Forrester previously referred to. As a matter of fact, they may be used in place of or with magnetic driver matrices.

One interesting feature of the magnetic driving switches is the conservation of power possible. All the power that is absorbed from a driving source is the power required to turn over the cores of the magnetic switch from an N or P condition, or the reverse. Any excess of power above that required for such turnover is inductively coupled to the output coils and is thus transmitted to the output circuit. Accordingly, the switch is an extremely efficient one and has a very high power transmission efficiency.

Although the switch was described with a number of cores equal to $2^n$ where $n$ was the number of inputs, such numbers are by no means the only possible ones. For $n$ inputs, there may be less than $2^n$ outputs, let us say $m$ outputs, by the simple expedient of omitting $2^n-m$ cores of the switch corresponding to the combination of the n inputs which it is desired to ignore. For example, in a binary coded decimal system, 10 cores may be used for the 4 binary digits of the code, so that the switch may be considered as a translator from the coded decimal to straight decimal. This is illustrated in Figure 16.

Figure 16 is a schematic diagram of a converter from the binary system to the decimal system. Ten cores 400 are shown in the drawing. A common N restoring tube 402 and coil 404 is provided. The input signals to the four pairs of driver tubes 410A, 410B; 412A, 412B; 414A, 414B; and 416A, 416B are push-pull and may be designated as inputs 1, 2, 4 and 8. The coils 430A, 430B, 432A, 432B, 434A, 434B, 436A, 436B, which are coupled to the cores consist of P and N windings in series. The coils are the plate loads of the respective driver tubes. Considering any pair of A and B coils for example, such as 430A and 430B, on any core when the 430A coil winding has a sense to provide a P drive and the 430B winding has a sense to provide an N drive, it is held to represent the digit zero, then when the 430A and 430B windings on any core have a reverse sense then the digit one is represented. The combinatorial winding connections can then be set up. Each pair of coils, where coupled to a core can be made to represent a "one" or a zero in accordance with the code value required for that core. The N windings 418 on the cores are at least three times the number of turns of the P windings 420, so that all the P windings 420 on each core 400 must have current in them in order that the core be turned over. The binary representation for each core is shown on the left side of the diagram and the decimal representation for each core is shown on the right side of the diagram next to the output winding. If, for example, it is desired to provide an output in decimal code for an input in the binary coded decimal should the binary coded decimal be the number 4, push-pull signals are applied to the 1, 2 and 8 tube pairs so that the "0" side of each of the duotriodes 410A, 412A, 416A is made conductive (in this instance the 0 side is the right side). Push-pull signals are applied to the No. 4 tube pair 414A, 414B, so that the "one" side 414B is rendered conductive (in this instance the "one" side is the left side the duotriode). Accordingly, all the P windings on the fourth magnetic element from the top as viewed in Fig. 16 provide a magnetomotive force to drive this element in a P direction. In none of the other magnetic elements is a magnetomotive force being applied solely by all of the P windings. Consequently, only the number 4 magnetic element will provide an output.

There has been shown and described hereinabove a magnetic switch which is novel, unique and inexpensive. This switch permits the switching to one out of many channels on the basis of the smallest number of bi-valued inputs. It can provide signals of any desired impedance level and of either or both polarities.

What is claimed is:

1. A magnetic switch comprising a plurality of magnetic elements, a plurality of coils, one or more of said coils being coupled to every one of said magnetic elements, the remaining ones of said coils being inductively coupled to different ones of said magnetic elements in accordance with a desired combinatorial code, means to apply a current to selected ones of said remaining coils to cause a change in magnetic condition of a desired one of said elements, a plurality of output windings, each output winding being coupled to a different element, and means to apply a current to said one or more of said coils to restore said desired one of said elements substantially to its magnetic condition prior to being changed.

2. A magnetic switch comprising a plurality of magnetic elements, a plurality of windings on each of said magnetic elements, one winding on each said element being an output winding, the remaining windings being wound on the elements with differing senses, means connecting each of said remaining windings on said elements in series in accordance with a desired combinatorial code, and means to apply currents to selected ones of said series connected windings to cause a change in magnetic condition of a desired one of said elements whereby a voltage is induced in the output winding of said element.

3. A magnetic switch as recited in claim 2 wherein said means to apply currents to selected ones of said series connected windings includes an electron discharge tube, for each of said series connected windings, each of which tubes has an anode, a cathode and a control grid, a different one of said series-connected windings being connected to the anode of a different one of said electron discharge tubes as an anode load.

4. A magnetic switch as recited in claim 2, wherein said means to apply currents to selected ones of said series connected windings includes a driver magnetic element associated with each of said series connected windings, means to inductively couple each of said series connected windings with its associated driver magnetic element, and means to alter the magnetic condition of selected ones of said driver magnetic elements to induce currents in the associated series connected windings whereby the magnetic condition of a desired one of said magnetic elements may be altered.

5. A magnetic switch comprising a plurality of magnetic elements, a plurality of windings on each of said magnetic elements, half of said windings being wound in one sense, the other half of said windings being wound in the opposite sense, means connecting in series windings on some of said elements with windings on others of said elements in accordance with a desired combinatorial code, and means to apply currents to selected ones of said series connected windings to excite all the windings in one sense on one element whereby the magnetic condition of only said one element is altered.

6. A magnetic switch comprising a plurality of magnetic elements, a plurality of windings on each of said magnetic elements, a first one of said plurality of windings on each element being wound in one sense, half of the remainder of said plurality of windings being wound in said one sense, the other half of said remainder being wound in an opposite sense, means connecting all said first ones of said windings in series, means interconnecting the remainder of said windings on all said elements in accordance with a desired combinatorial code, means for applying currents to selected ones of said interconnected windings to excite all the remainder windings wound in one sense on a desired element whereby the magnetic condition of said desired element is altered, and means for applying a current to said series connected first windings whereby all of said elements are restored to a given condition of magnetization.

7. A magnetic switch as recited in claim 6 wherein said means for applying currents to selected ones of said interconnected windings includes a plurality of electron discharge tubes each having an anode, a cathode and a control grid, each of said series interconnected windings being connected to the anode of a different one of said tubes as an anode load, and said means for applying a current to said series connected first windings includes an electron discharge tube having anode, cathode and grid electrodes, said series connected first windings being coupled to the anode of said last named electron discharge tube as an anode load.

8. A switch as recited in claim 6 wherein said magnetic elements are in the form of toroidal rings.

9. A magnetic switch comprising a plurality of magnetic elements, a plurality of windings on each of said magnetic elements, a first one of said windings being wound in one sense, the remainder of said windings being wound in an opposite sense, means connecting all said first ones of said windings in series, means connecting in series the remainder of said windings on others of said elements in accordance with a desired combinatorial code, means for applying currents to selected ones of said series connected remainder windings to excite all the remainder windings on one element whereby the magnetic condition of only said one element is altered, and means for applying a current to said series connected first windings whereby all of said elements are restored to a given condition of magnetization.

10. A switch as recited in claim 9 wherein said magnetic elements are in the form of toroidal rings.

11. In combination, a plurality of magnetic memory elements arranged in rows and columns, two sets of windings on each element, means connecting in series one of said two sets of windings on each of the elements in each row into row coils, means connecting in series the other of said two sets of windings on each of the elements in each column into column coils, means to selectively drive said row coils, and means to selectively drive said column coils, each of said last named means including a plurality of driver magnetic elements, a plurality of windings on each of said driver magnetic elements, one winding on each of said driver magnetic elements being an output winding, means connecting the remaining windings on all of said driver elements in series in accordance with a desired combinatorial code, each of the output windings of said means to selectively drive said column coils being connected to a different one of said column coils, each of the output windings of said means to selectively drive said row coils being connected to a different one of said row coils, means to apply currents to selected ones of said series connected windings of said means to selectively drive said column coils to cause a change in magnetic condition of a desired one of said driver elements, and means to apply currents to selected ones of said series connecting windings of said means to selectively drive said row coils to cause a change in magnetic condition of a desired one of said driver elements whereby currents induced in the output windings cause a change in magnetic condition of a memory element coupled to the row and column coils coupled to said output windings.

12. A magnetic switch comprising a plurality of magnetic elements, a plurality of windings on each of said magnetic elements, a first one of said windings on each element being wound in one sense, the remainder of said windings on each element being wound in an opposite sense, means connecting all said first ones of said windings in series to form a first coil, means connecting in series the remainder of said windings on some of said elements with the remainder of said windings on others of said elements in accordance with a desired combinatorial code to form a plurality of second coils, means connecting one end of said first coil with one end of every one of said second coils, means to apply a source of operating potential to the other end of said first coil, a plurality of electron discharge tubes and means coupling each one of said tubes to a different one of said plurality of second coils.

13. A magnetic switch comprising a plurality of magnetic elements, a plurality of pairs of coils of increasing order each consisting of a plurality of series connected windings, one of the lowest order pair of said coils being inductively coupled by windings to every alternate one of said elements, the other of said lowest order pair of coils being inductively coupled by windings to the remaining ones of said elements, one of the next higher order pair of said coils being inductively coupled to every alternate two of said elements, the other of said next higher order pair of said coils being inductively coupled to all of the remaining ones of said elements, each higher order pair of coils being inductively coupled in similar fashion to a number of alternately spaced magnetic elements which is twice the number of magnetic elements to which the immediately preceding lower pair of coils is coupled, one of the highest order pair of coils being inductively coupled to one half the total number of magnetic elements which are adjacent to one another, the other of said highest order coils being inductively coupled to the remaining one half of said elements, a single coil inductively coupled by a winding to every magnetic element, and means to selectively excite one of each of said pairs of coils and said single coil to drive a desired one of said elements to a desired magnetic condition.

14. A magnetic switch as recited in claim 13 wherein the windings of said single coil are of opposite sense to the sense of the windings of said plurality of coils, one end of said single coil is coupled to one end of each of said plurality of coils, means to apply an operating potential to the other end of said single coil, and said means to selectively excite one of each of said pairs of coils includes a separate electron discharge tube coupled to the other end of each one of said plurality of coils.

15. A magnetic switch as recited in claim 14 wherein there is included a restore coil inductively coupled to every magnetic element, means to apply a potential to one end of said restore coil, and an electron discharge tube coupled to the other end of said restore coil.

16. A magnetic switch as recited in claim 13 wherein the number of turns of a winding of said single coil is as many times the number of turns of a winding of any one of said plurality of coils as there are pairs of coils in said plurality.

17. A magnetic switch comprising a plurality of magnetic elements, a plurality of windings on each of said magnetic elements, one of said plurality of windings being wound in opposite sense to the remainder of said plurality of windings, means coupling in series said one of said windings on each element to form a first coil, and means to connect in series the remainder of the windings on some of said elements with the remainder of the windings on others of said elements in accordance with a desired combinatorial code.

18. A magnetic switch as recited in claim 13 wherein the sense of the windings of said highest order pair of coils is opposite to the sense of the remaining windings on said elements, and the number of turns on each one of the windings on each element is equal.

19. A magnetic switch comprising a plurality of magnetic elements, an output winding wound on each of said elements, a plurality of pairs of driving coils each of which is inductively coupled to certain ones of said magnetic elements, a first coil of a pair including windings on each element of first groups of magnetic elements, a second coil of a pair including windings on each element of second groups of magnetic elements, each of said first groups of elements being alternate with each of said second groups of elements, the number of elements in the groups connected to different pairs of coils increasing in binary fashion until the number of elements in the last of said groups is half the number of elements in said plurality of elements, means to apply currents to selected ones of each of said pairs of coils to excite all the windings on one of said magnetic elements whereby the magnetic condition of only said one element is altered, a restoring coil including a winding on each of said elements, and means for applying a current to said restoring coil to restore said altered magnetic element to its original condition.

20. A magnetic switch comprising a plurality of magnetic elements, an output winding wound on each of said magnetic elements, a plurality of pairs of coils, each of said coils including a separate winding on every one of said elements, the sense of each winding on a magnetic element being determined in accordance with a binary code, means to apply currents to selected ones of each of said pairs of coils to excite all of the windings in one sense on one of said magnetic elements whereby the magnetic condition of only said one element is altered, a restoring coil including a winding on each of said elements, and means for applying a current to said restoring coil to restore said altered magnetic element to its original condition.

21. A magnetic switch as recited in claim 13 wherein said means for applying currents to selected ones of each of said pairs of coils includes a driver magnetic element associated with each of said coils and inductively coupled thereto, and means to alter the magnetic condition of selected ones of said driver magnetic elements for inducing currents in said selected ones of said pairs of coils.

22. A magnetic switch as recited in claim 21 wherein said means to alter the magnetic condition of selected ones of said driver magnetic elements includes windings on each of said driver elements, a plurality of electron discharge tubes each of which has anode, cathode and control grid electrodes, said windings being connected to the anodes of different ones of said electron discharge tube as anode loads, a restoring coil inductively coupled to each of said driver elements including a winding on each of said driver elements, and another electron discharge tube having an anode, cathode and control grid, said restoring coil being connected to the anode of said another electron discharge tube as an anode load.

23. A magnetic switch comprising a plurality of magnetic elements, a plurality of coils, each of said coils being inductively coupled to different ones of said magnetic elements in accordance with a desired combinatorial code, a plurality of output windings each of which is coupled to a different one of said magnetic elements, means to apply a current to selected ones of said coils to cause a change in magnetic condition of a desired one of said elements, and means associated with each of said plurality of magnetic elements to suppress undesired voltages occurring in each of said output coils as a result of the application of currents by said means to apply a current.

24. A system as recited in claim 23 wherein said means associated with each of said plurality of magnetic elements to suppress noise voltages comprises an additional magnetic element inductively coupled to the same coils as the element with which it is associated, said element having material having its magnetic characteristics selected to induce in said output coils voltages opposite and substantially equal to said noise voltages as a result of the application of currents by said means to apply a current.

25. A magnetic switch comprising a plurality of pairs of toroidal magnetic elements, one element of each of said pairs of magnetic elements being composed of a material having a substantially rectangular hysteresis characteristic with substantially linear characteristics in the magnetic saturation regions, the other element of each of said pairs of elements being composed of a material having a permeability which is low compared to the permeability of said one element and which has a linear hysteresis characteristic with a slope which is the negative of the slope of the characteristic of said one element in the magnetic saturation regions, a plurality of coils, each of said coils being inductively coupled to different ones of said pairs of magnetic elements in accordance with a desired combinatorial code, a plurality of output windings each of which is coupled to a different pair of said magnetic elements, and means to apply a current to selected ones of said coils to cause a change in magnetic condition of a desired pair of said elements.

26. A magnetic switch comprising a plurality of first toroidal magnetic elements, a plurality of coils, each of said coils being inductively coupled to different ones of said magnetic elements in accordance with a desired combinatorial code, a plurality of second toroidal magnetic elements each one of which is inductively coupled to a different one of said coils, means to simultaneously alter the magnetic condition of selected ones of said second magnetic elements whereby currents are induced in the coils coupled thereto and a desired one of said first toroidal magnetic elements has its magnetic condition changed, and means to simultaneously restore all said second toroidal magnetic elements to their initial condition whereby all said first toroidal magnets are restored to their initial condition of magnetization.

27. A magnetic switch as recited in claim 26 wherein said means to alter simultaneously the magnetic condition of selected ones of said magnetic elements comprises a winding in one sense on each one of said second magnetic elements, and a plurality of electron discharge tubes each of which is coupled to a different one of said windings, and said means to simultaneously restore all said second elements includes a winding on each of said second elements which is opposite to said one sense, means connecting all said opposite sense windings in series, and a restoring electron discharge tube, said series connected windings being connected to said restoring electron discharge tube as a load.

28. A magnetic switch as recited in claim 26 wherein said means to alter simultaneously the magnetic condition of selected ones of said second magnetic elements comprises two windings of opposite sense on each one of said second elements, means connecting in series each winding on one element with a winding of opposite sense on the adjacent second magnetic elements, and a plurality of electron discharge tubes, each of said two opposite sense series connected windings being connected to a separate tube as a load.

29. A magnetic switch as recited in claim 26 wherein said means to alter simultaneously the magnetic condition of selected ones of said second magnetic elements comprises a plurality of coils, different ones of said plurality of coils being inductively coupled to different pairs of said second elements, said different ones of said coils including a winding in one sense on one element of a pair connected in series with a winding of opposite sense on the other element of said pair, a last one of said coils being inductively coupled to each one of said elements, said last one of said coils including a winding on each one of said elements, the sense of said windings alternating on every other element, and a plurality of electron discharge tubes, each coil being connected to a different tube as a load.

30. A magnetic switch as recited in claim 26 wherein said means to alter simultaneously the magnetic condition of selected ones of said second magnetic elements comprises a plurality of coils, different ones of said coils being inductively coupled to different pairs of said second elements, said coupling including a winding in one sense on one element of a pair connected in series with a winding of opposite sense on the other element of said pair, one coil of said plurality of coils being inductively coupled to one element of each pair of second elements, said last named coil including a winding on each element to which it is coupled having a sense opposite to the sense of the winding of said other coil on said element.

31. A magnetic switch comprising a plurality of magnetic elements, a plurality of selecting coils inductively coupled to different ones of said elements in accordance with a desired binary code, a plurality of output windings, each output winding being coupled to a different element and a restoring coil coupled to all the elements in said switch.

32. A magnetic switch comprising a plurality of saturable magnetic cores, a plurality of pairs of selecting coils inductively coupled each in a different way to said cores, means to apply current simultaneously to a selected one only of each of said pairs of said coils to select only a desired one of said cores in accordance with a predetermined combinatorial code for changing the magnetic state of said selected core to a desired state, output coils coupled to different ones of said cores, and means to drive all said cores simultaneously to saturation in the other magnetic state.

33. A magnetic switch comprising a plurality of saturable magnetic cores, a plurality of pairs of selecting coils inductively coupled to different ones of said elements in accordance with a desired combinatorial code, means to excite selected ones of each of said pairs of coils simultaneously to change the magnetic state of only a selected core in accordance with said code, and a plurality of output coils, each individually coupled to a different core, the one of said output coils coupled to said selected core thereby responding to the said combined coil excitation and a restoring coil coupled to all of said cores.

References Cited in the file of this patent

UNITED STATES PATENTS 1,010,413 Crehore ---------------- Dec. 5, 1911

OTHER REFERENCES

Publication: "An Electronic Digital Computer" by A. D. Booth, Electronic Engineering (British), December 1950, pp. 492—498.